March 2, 1965 R. D. KODIS ETAL 3,172,088

DRIVE CIRCUIT FOR MAGNETIC CORE MEMORY

Filed Oct. 25, 1960 2 Sheets-Sheet 1

INVENTORS
ROBERT D. KODIS
SADIA S. GUTERMAN

BY *Morse + Altman*

ATTORNEYS

INVENTORS
ROBERT D. KODIS
SADIA S. GUTERMAN
BY
Morse & Altman
ATTORNEYS 3,172,088

DRIVE CIRCUIT FOR MAGNETIC CORE MEMORY

Robert D. Kodis, Brookline, and Sadia S. Guterman, Boston, Mass., assignors to Di/An Controls, Inc., Boston, Mass., a corporation of Massachusetts Filed Oct. 25, 1960, Ser. No. 64,887
5 Claims. (Cl. 340—174)

The present invention relates to magnetic core memory systems and, more particularly, to magnetic core memory systems of the type comprising a plurality of bistable magnetic cores, each of which is capable of assuming a first flux direction representing a ZERO and a second flux direction representing a ONE. A so-called coincident current memory of one type comprises rows and columns of cores, of which the individual rows are provided with individual so-called, X drive lines and the individual columns are provided with individual, so-called, Y drive lines. A so-called half amplitude pulse on any single drive line is incapable of reversing the flux of any core in association therewith but coincident half-amplitude pulses of appropriate polarity on selected X and Y drive lines are capable of reversing the flux on the core at their intersection. Also provided are an inhibit line of suitable polarity and a sense line in association with all cores. A pulse on the inhibit line, in coincidence with half amplitude drive pulses of suitable polarity on selected X and Y drive lines, prevents a flux reversal from occurring in the core at their intersection. And coincident half amplitude pulses of suitable polarity on selected X and Y drive lines are capable of producing a flux reversal in the core at their intersection in order to generate a pulse in the sense line. Thus, if initially all cores are reset to zero: coincident half amplitude pulses on selected X and Y drive lines will write a ONE into the core at their intersection; coincident half amplitude pulses on selected X and Y drive lines and on the inhibit line will write a ZERO (maintain the ZERO) into the core at their intersection; and the ZERO or ONE state of any core may be determined by whether or not coincident pulses on the X and Y drive lines intersecting at that core produce a change of flux that is detected by the sense line. The most economical arrangement for programming the introduction of information into or removal of information from such a core memory system is merely by pulsing the X and Y drive lines in a simple sequence. However, the inflexibility of such a sequential access arrangement limits its applicability. On the other hand, random access arrangements, although more versatile, are more expensive.

The primary object of the present invention is to combine the economy of sequential access and the versatility of random access in a programming arrangement by which a known sequence of drive pulses are generated by shifting a ONE along the stages of a ring counter in response to a series of input clock pulses and which serves to remember the last output position so that when interrupted a series of such pulses may be continued in order. The arrangement is capable of a variety of flexible combinations, one of the more important comprising a read drive pulse ring counter and a write drive pulse ring counter that may be shifted independently to permit information to be written into and read from arbitrary interlaced sequences.

Other objects of the present invention will in part be obvious and will in part appear hereinafter.

For a fuller understanding of the nature and objects of the present invention, reference should be had to the following detailed description taken in connection with the accompanying drawings, wherein.

Figure 1:
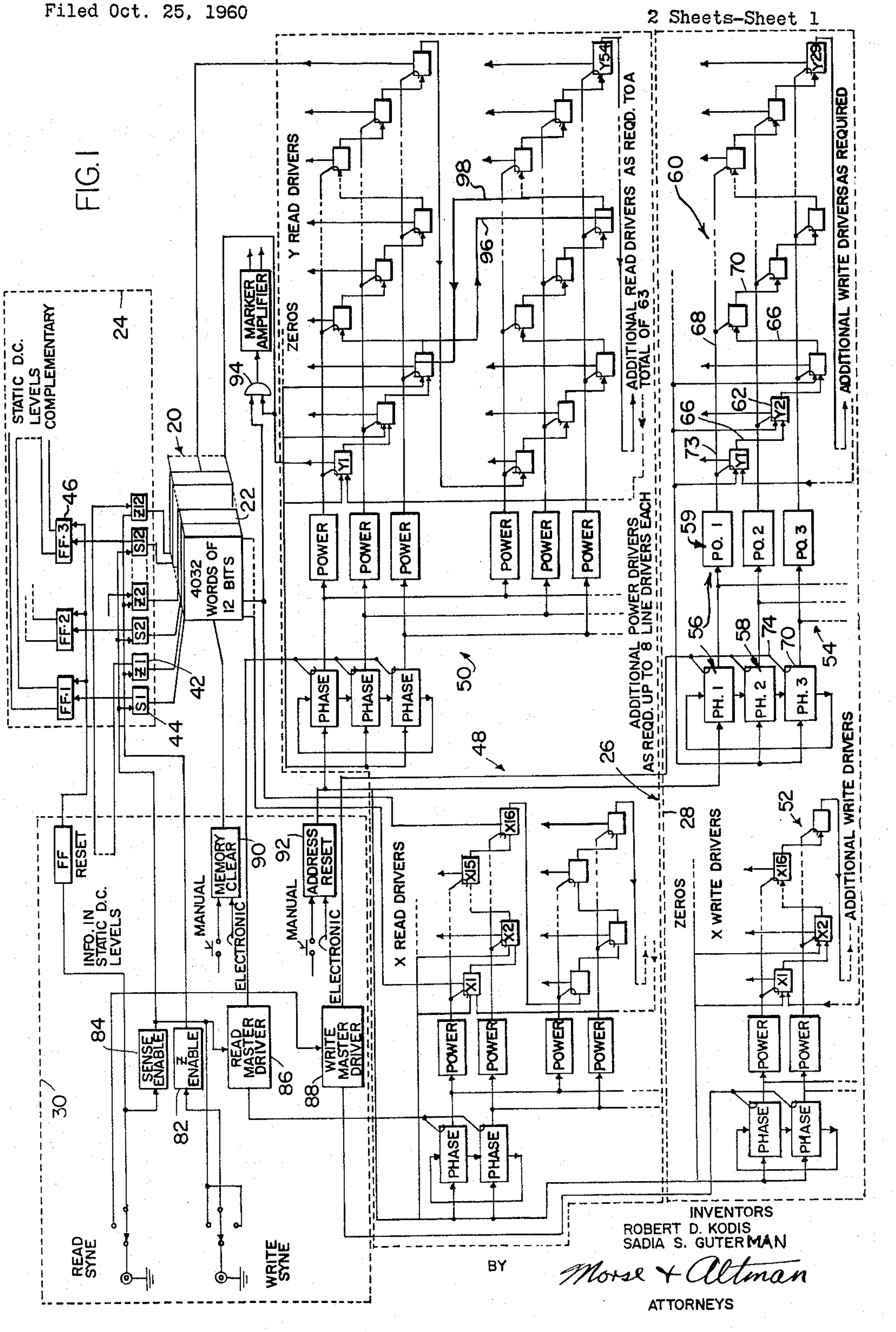
FIG. 1 is a schematic block diagram of a system embodying the present invention.
Figure 2:
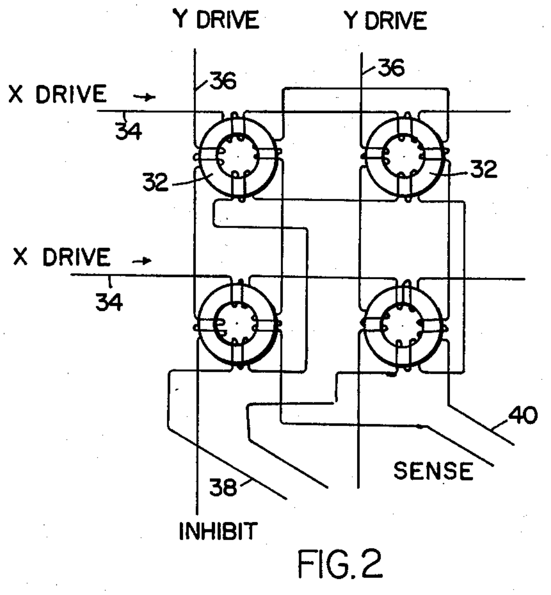
FIG. 2 is a schematic electrical diagram of a fragment of a component of the block diagram of FIG. 1.

Generally the system of FIG. 1, illustrated as embodying the present invention, comprises a stack 20 of twelve core frames 22, each having 64 cores in a row and 63 cores in a column. Associated with stack 20 are frame selection read-write circuitry 24, core selection read circuitry 26, core selection write circuitry 28 and master control circuitry 30. As is shown in FIG. 2, each of core frames 22 includes a plurality of cores 32, each in the form of a ferromagnetic annulus. Individual rows of cores are provided with individual X drive lines 34 and individual columns of cores are provided with individual Y drive lines 36. Similarly positioned X drive lines of sequence of frames 22 are serially connected and similarly positioned Y drive lines of sequence of frames 22 are serially connected. Also provided are a single inhibit line 38 and a single sense line 40 in association with all of the cores of a single frame. The arrangement is such that: the binary digits of a word are written into similarly positioned cores of sequence of frames 22 under the control of selected X and Y drive lines, associated with all of the frames, and individual inhibit lines, associated with individual frames; and a word of bits is read from similarly positioned cores of sequence of frames 22 under the control of selected X and Y drive lines, associated with all of the frames, and individual sense lines, associated with individual frames.

Frame selection read-write circuitry 24 includes individual circuits in association with the inhibit and sense lines of individual frames 22 of memory 20. A plurality of inhibit drive circuits 42, in the form of magnetic amplifiers designated Z1 through Z12, apply inhibit half-amplitude pulses to the inhibit lines of their associated frames in conjunction with coincident read or write pulses to be described below. A plurality of sense circuits 44, in the form of magnetic amplifiers designated S1 through S12, respond to pulses from their associated frames. And a series of flip-flop circuits 46, designated FF1 through FF12, provide static indications of the binary digits of the words designated by aligned cores being sensed.

Core selection read control circuit 26 includes an X axis network 48 and a Y axis network 50. Core selection write control circuit includes an X axis network 52 and a Y axis network 54. The details of these networks are similar in all respects. Accordingly an explanation only of Y axis network 54 need be given in order to illustrate their operation. Y axis network 54 is shown as including: an input ring counter 56 including three phase drivers 58, designated P*h*1 through P*h*3; associated power drivers 59, P*o*1 through P*o*3; and an output ring counter 60 including trios of selection line drivers 62, designated Y1 through Y27. Additional Y selection line drivers, together with appropriate associated phase drivers and power drivers, bring the total number of selection line drivers to sixty-three.

Figure 3:
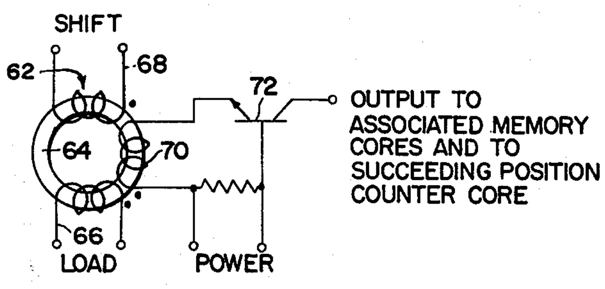
FIG. 3 is a schematic electrical diagram of a component of the block diagram of FIG. 1.

The details of selection line drivers 62 are designated in FIG. 1 and illustrated in FIG. 3 as comprising: a core 64 capable of assuming one of two opposited flux directions; a load line 66 by which the core may be set to ONE by a flux change in a preceding core of the ring counter, the load on load line 66 being the electromagnetic coupling between the turns of load line 66 and core 64 by which switching of core 64 is effected in response to switching of the core that drives it; a shift line 68 by which the state of the core if set to ONE may be reset to ZERO by a shift pulse applied to other cores of the ring counter in common; and an output line 70 by which a change of flux caused by shift line 68 produces an output pulse that is amplified by a suitable transistor amplifier 72. The gain of transistor amplifier 72 is such that transistor amplifier 72 is driven to saturation by the shift pulse. As will be observed in FIG. 1, a shift pulse applied to selection line driver Y1, if set to ONE, will generate a change in flux and a consequent output pulse for application as at 73 to associated memory cores of its associated column and as at 66 to the load line of selection line driver Y2. A ONE therefore is shifted in sequence from selection line driver Y1 through the intervening selection line drivers to selection line driver Y63 and back, each shift being accompanied by a selection line drive pulse in an associated row of cores. In order to prevent the occurrence of both shift pulse on shift line 68 and a set pulse on load line 66 in any one of selection line drivers 60, selection line drivers 60 are staggered as shown an energized by shift pulses that occur in such a sequence that coincidence of a shift pulse and a set pule is impossible.

Figure 4:
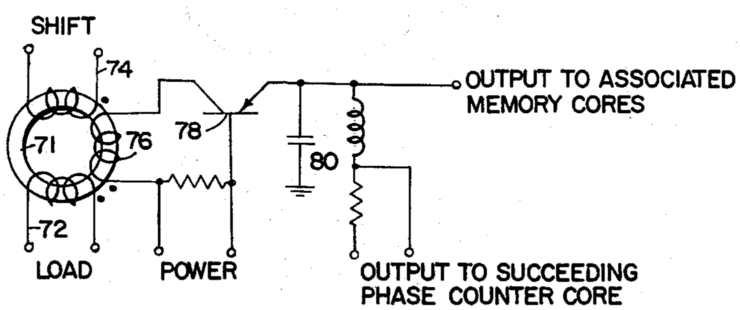
FIG. 4 is a schematic electrical diagram of another component of the block diagram of FIG. 1.

In order to generate such a staggered sequence of shift pulses, aforementioned input ring counter 56 serves as a three phase clock. Ring counter 56 includes three phase drivers, designated P*h*1 through P*h*3, details of one of which is designated in FIG. 1 and shown in FIG. 4. This phase driver, as shown in FIG. 4, includes: a core 71 capable of assuming one of two stable flux conditions; a load line 72 for setting the core to a one upon receipt of set pulse from a preceding core, the load on load line 72 being the electromagnetic coupling between the turns of load line 72 and core 71 by which switching of core 71 is effected in response to the core that drives it; a shift line 74 for generating a change in state if the core has been set by load line 72, and an output line 76 which generates a pulse for application to a transistor amplifier 78. An output pulse from transistor amplifier 78 is applied directly through a power driver 62 as a shift pulse to associated selection line drivers and through a capacitor-choke delay 80 to the shift line of input ring counter 56. The operation of delay 80 is such that an applied pulse generates a potential across the capacitor immediately and the capacitor then discharges through the choke, the timing being determined by the time constant of the capacitor, choke, resistor loop. In consequence, shift pulses are applied in sequence through power drivers 59. Therefore, a shift pulse received by a phase driver from the master driver now to be described and a shift pulse received by this phase driver from another phase driver cannot occur simultaneously.

Master control network 30 includes conventional inhibit and sense enable circuits 82 and 84 for pulsing inhibit circuits 42 and sense amplifiers 44. It also includes a read master driver 86 for shift pulsing the phase drivers of core selection read control 26 and a write master driver 88 for shift pulsing the phase drivers of core selection write control 28. Suitable memory clear and address reset circuits 90 and 92 are provided. A marker core 94, energized by coincident pulses from the last X and Y selection line drivers of a sequence, indicates the end of this sequence.

In operation, information is written into core memory 22 through inhibit circuits 42 and X and Y selection read circuits 48 and 50. The output ring counters of these circuits provide selection line drive pulses as well as a running indication of the position of the last core from which a read pulse has been applied. Information is read from core memory 22 through sense amplifiers 44 in response to X and Y selection write circuits 52 and 54. The output ring counters of these circuits provide selection line drive pulses as well as a running indication of the position of the last core from which a write pulse had been applied. In this way a known sequence of words can be written into and a known sequence of words can be read from the memory in interlaced fashion. The versatility of the system is illustrated by the use of cross-inhibit lines as shown at 96 and 98 by which one read driver is capable of selecting a field normally under the control of another and vice versa.

Since certain changes may be made in the above description and accompanying drawings without departing from the invention herein involved, it is intended that all matter contained in the above description or shown in the accompanying drawings shall be interpreted in an illustrative and not in a limiting sense.

What is claimed is:

1. A memory system comprising a plurality of arrays, each single array including a series of first selection lines along which cores of said single array are arranged and with which said cores of said single array communicate magnetically, a series of second selection lines along which said cores of said single array are arranged and with which said cores of said single array communicate magnetically, said first selection lines and said second selection lines being discrete electrically and being crossed geometrically, each of said cores being capable of assuming one of two alternate stable magnetic states, each of said cores of said single array being positioned at an intersection of one of said first selection lines and one of said second selection lines, an inhibit line along which the cores of said plurality of arrays are arranged and with which said cores of said plurality of arrays communicate magnetically, a sense line along which said cores of said single array are arranged and with which said cores of said single array communicate magnetically, at least one first ring counter including a first sequence of cores, first shift means along which said first sequence of cores are arranged and by which successive cores of said first sequence are actuated in response to successive pulses applied to said first shift means, a first sequence of load lines arranged between pairs of adjacent cores of said first sequence and communicating magnetically with said pairs of adjacent cores of said first sequence, and a first sequence of output lines communicating magnetically with said first sequence of cores and connected electrically to said series of first selection lines, at least one second ring counter including a second sequence of cores, second shift means along which said second sequence of cores are arranged and by which successive cores of said second sequence are actuated in response to successive pulses applied to said second shift means, a second sequence of load lines arranged between pairs of adjacent cores of said second sequence and communicating magnetically with said pairs of adjacent cores of said second sequence and a second sequence of output lines communicating magnetically with said second sequence of cores and connected electrically to said series of second selection lines, clock means for applying in synchronism sequences of pulses to said first shift means, said second shift means and said inhibit line, and means communicating with the sense lines of said arrays for indicating change of magnetic state, said pulses occurring at selected ones of a predetermined sequence of times, a single pulse on one of said first selection lines being unable to alter the magnetic state of cores communicating therewith, coincident pulses on one of said first selection lines and one of said second selection lines being capable of switching the stable magnetic state of a core at the intersection thereof in the absence of a pulse on said inhibit line and being incapable of switching the stable magnetic state of a core at the intersection thereof in the presence of a pulse on said inhibit line the magnetic states of said first sequence of cores of said first ring counter and the magnetic states of said second sequence of cores of said second ring counter providing a running indication of which pulses of said sequences of pulses from said clock means have been applied at any particular time.

2. The memory system of claim 1 wherein said means communicating with said sense lines for indicating change in magnetic state are flip-flop circuits.

3. The memory system of claim 1 wherein said cores of the ring counters communicate with said selection lines through transistor drivers.

4. The memory system of claim 3 wherein said transistor drivers when energized operate at saturation.

5. The memory system of claim 1 wherein said sequence of cores of said ring counters are staggered in groups and wherein a sequence of delay means applies shift pulses to said different groups at different times.

References Cited by the Examiner

UNITED STATES PATENTS

| | | | |
|---|---|---|---|
| 2,911,631 | 11/59 | Warren | 340—174 |
| 2,963,687 | 12/60 | Briggs | 340—174 |
| 2,963,688 | 12/60 | Amemiya | 307—88 X |
| 2,981,847 | 4/61 | Ruhman | 307—88 |
| 2,981,931 | 4/61 | Tate | 340—174 X |
| 3,048,827 | 8/62 | Wright | 340—174 |

IRVING L. SRAGOW, *Primary Examiner.*